H. O. EVANS.
AUTOMATIC REVERSING MECHANISM.
APPLICATION FILED FEB. 15, 1908.

938,997.

Patented Nov. 2, 1909.

3 SHEETS—SHEET 3.

Witnesses
P. F. Nagle.
L. Rouville.

Inventor
Henry O. Evans,
By Wiederstein & Fairbanks.
Attorneys

UNITED STATES PATENT OFFICE.

HENRY O. EVANS, OF PHILADELPHIA, PENNSYLVANIA.

AUTOMATIC REVERSING MECHANISM.

938,997. Specification of Letters Patent. Patented Nov. 2, 1909.

Application filed February 15, 1908. Serial No. 416,028.

*To all whom it may concern:*

Be it known that I, HENRY O. EVANS, a citizen of the United States, residing in the city and county of Philadelphia, State of Pennsylvania, have invented a new and useful Automatic Reversing Mechanism, of which the following is a specification.

This invention relates to an improved type of clutch for direct and reverse driving of machine parts and is especially adapted for use in a threading and tapping machine, although of course, it may be used in other machines wherein a like action takes place.

The object of my invention is to provide a clutch which automatically reverses the driving mechanism at a predetermined time and at the end of the reverse movement is thrown out of engagement so as to stop the machine.

It further consists of other novel features of construction, all as will be hereinafter fully set forth.

Figure 1:
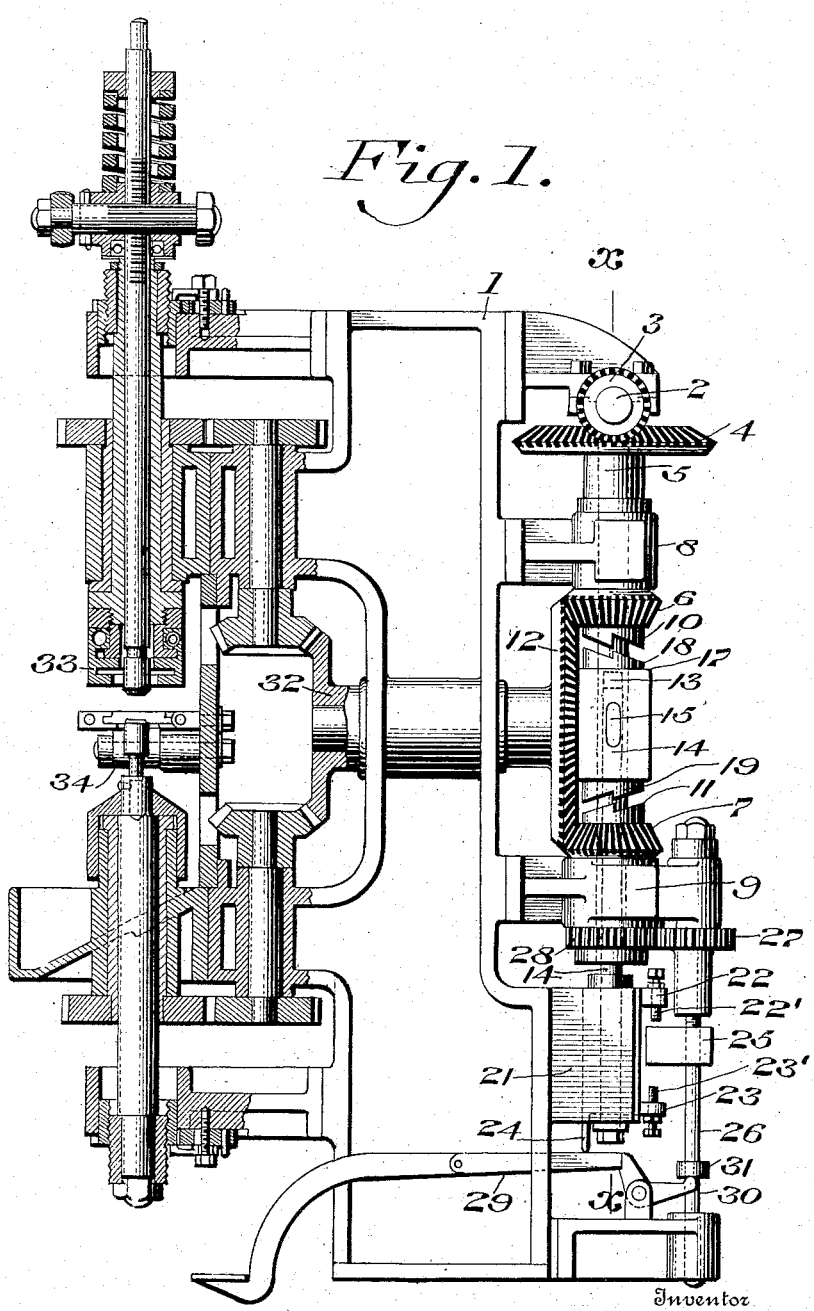
Figure 2:
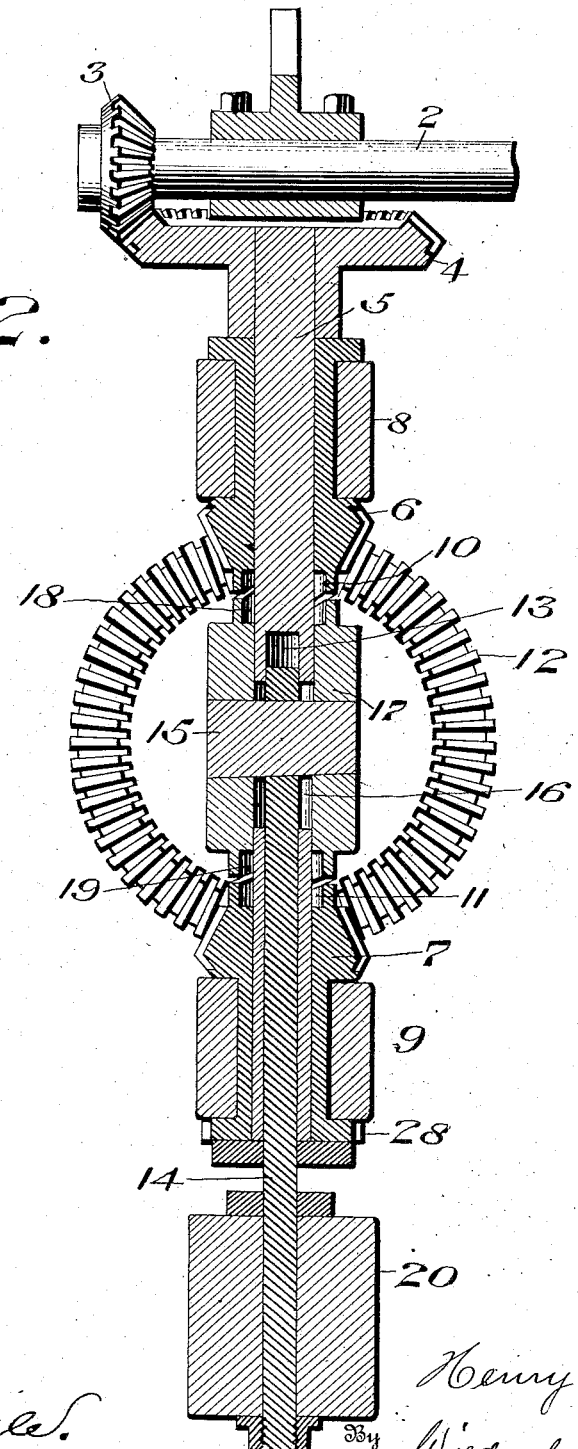
Figure 3:
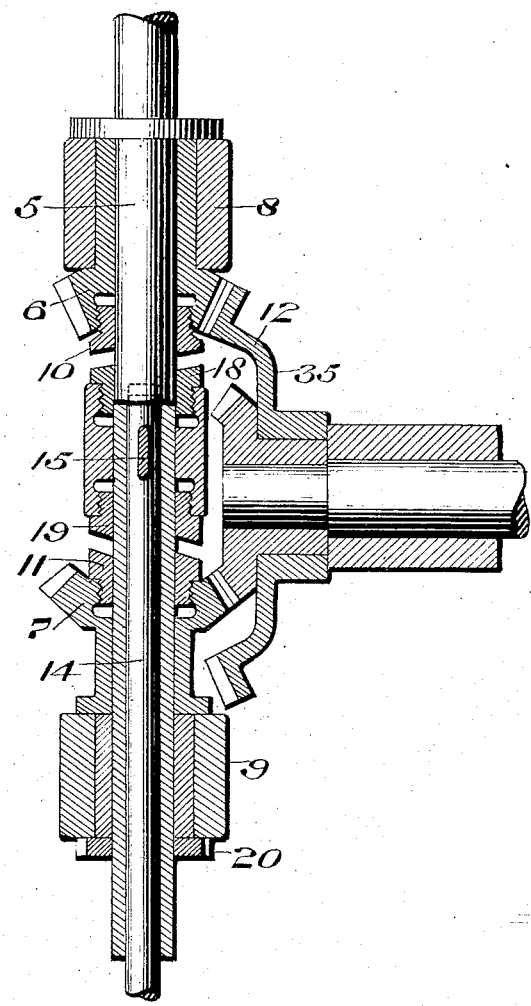

Figure 1 represents a machine embodying my invention, certain of the parts being shown in section. Fig. 2 represents a sectional view on line $x-x$, Fig. 1. Fig. 3 represents a section showing a modification.

Similar numerals of reference indicate corresponding parts in the figures.

Referring to the drawings:—1 designates the frame of a suitable machine carrying a driving shaft 2, mounted on which is a beveled gear 3 adapted to mesh with a similar gear 4, keyed to an operating shaft 5 on which are loosely sleeved two beveled gears 6 and 7 supported by heads 8 and 9, bolted or otherwise supported by the main frame 1. These gears 6 and 7 are provided with a clutch 10 and 11, respectively, for the purpose of rotating the beveled gear 12, with which said gears 6 and 7 mesh, in a forward or reverse direction, depending upon which of the said gears 6 and 7 are operated.

The shaft 5 is provided for a portion of its length with a bore 13, through which passes a rod 14 carrying a pin 15 which passes through a slot 16 in the shaft 5 and is made fast in a clutch sleeve 17, the latter being provided with clutch faces 18 and 19 adapted to engage with the clutch 10 or 11. This rod 14 is secured to a block 20 mounted against rotation in a head 21 and adapted for a sliding movement, which is given through the lugs 22, 23 or 24. The former two of these lugs carry adjustable members 22'—23' so positioned as to be engaged by the finger 25 fixedly secured to a screw threaded spindle 26, reciprocated by means of gears 27 and 28, the former of which is fixedly mounted upon a hub, having internal screw threads while the latter is keyed to the shaft 5. The lug 24 is located adjacent a treadle member 29 held in operative position by any suitable means, as a bell crank stop 30, which in turn is operated by the movement of the collar 31 keyed to the shaft 26.

It will be apparent that the beveled gear 12 through the shaft 32 and suitable gearing drives the operating tools, in this case a die 33 and tap 34, toward or away from each other, according as the machine is running forwardly or in a reverse direction.

The operation of the clutch mechanism is as follows: The operator having placed a part to be machined between the members 33 and 34, presses down the foot treadle 29 which, through the lug 24, raises the sliding block 20 and with it the rod 14, the latter by means of the key 15, throwing the clutch face 18 into engagement with the clutch face 10 of the beveled gear 6. It will be noted that the normal position of the rod 14 is with the sleeve 17, disengaged from the clutch faces. This movement starts the beveled gear 6 to drive the gear 12 in a forward direction and a cutting operation of the members 33 and 34 is performed. During such operation the threaded spindle 26 is moved longitudinally by means of the gears 27 and 28 and advances the finger 25 in a downward direction to meet the stop 23 formed on the block 20, while the collar 31 strikes the bell crank 30 and releases the treadle 29 to remove the same out of the downward path of the lug 24. As soon as this occurs, the rod 14 will be forced downwardly and carry with it the clutch sleeve 17 which is of course thrown out of gear with the clutch face 8 and being released from any frictional engagement the parts drop by gravity and throw the clutch face 19 into engagement with the clutch face 11 when the machine is driven in a reverse direction. The reverse operation threads the rod 26 back to its former position, carrying the finger 25 into engagement with the stop 22 which raises the rod 14 and clutch sleeve 17 out of engagement with the reverse clutch 11 and the machine comes immediately to a stop. It will of course be understood that the rod 26 is keyed or otherwise secured in any well known manner to the frame 1 in order to prevent rotation thereof during its up or down movement as the case may be.

In the modification shown in Fig. 3, means are provided for a quick return of the cutting mechanism on the reverse stroke, the same consisting of a pinion 35 suitably mounted on the driving shaft which carries the gear 12 and meshes with the beveled gear 7, previously described. It will be apparent that by means of this miter gear, I am enabled to give a quick return to the parts after the thread cutting has been accomplished thereby saving a great deal of time in the operation of the machine and allowing a large increase in the output of the product. It will be apparent that this clutch, while being very simple in its operation, combines a very desirable feature in the absolute stopping of the machine as soon as the cutting tools have been withdrawn from engagement with the part operated upon. This stopping allows the operator to remove the bushing or other part being machined without danger of injury from a moving part and the machine cannot be started until the operator again presses down the foot treadle 29.

From the above it will be understood that my device is simple in construction and positive in its action and in the drawings I have shown one form which will operate successfully in practice, although the arrangement of the parts may be varied and other instrumentalities may be employed which will come within the scope of my invention and I do not therefore desire to be limited to the exact construction as herein shown and described.

Having thus described my invention, what I claim as new and desire to secure by Letters Patent, is:—

1. In a device of the character described, a shaft, gears mounted thereon, each of said gears having clutch faces, a sleeve slidingly mounted on said shaft for rotation therewith and having clutch faces thereon, means operated by said shaft for positively releasing said sleeve clutch faces from either gear clutch face, and manually operated means for shifting said sleeve to engage one clutch face.

2. In a device of the character described, a shaft, gears mounted thereon, each of said gears having clutch faces, a sleeve slidingly mounted on said shaft for rotation therewith and having clutch faces thereon, means operated by said shaft for positively releasing said sleeve clutch faces from either gear clutch face, manually operated means for shifting said sleeve to engage one clutch face, and a stop to hold said sleeve in inoperative position.

3. In a device of the character described, a shaft, gears thereon, each of said gears having a clutch face, driving means for said shaft, a sleeve slidingly mounted on said shaft for rotation therewith, a rod secured to said sleeve, a block fixedly mounted on said rod having lugs thereon, a guide bracket for said block, a spindle, means actuated by said gears for moving the spindle longitudinally, and means carried by said spindle adapted to engage said lugs whereby the rod is shifted in either direction.

4. In a device of the character described, a shaft, gears thereon, each of said gears having a clutch face, a gear connecting said clutch gears whereby one is driven in the opposite direction from the other, a sleeve slidingly mounted for rotation on said shaft, a rod secured to said sleeve, a plurality of lugs on said rod, a manually operated lever adapted to engage one lug to shift said rod in one direction, a spindle suitably mounted for sliding movement, means operated by one of said gears for moving said spindle, and a trip carried by said spindle and located intermediate the remaining lugs whereby said rod is automatically shifted in either direction.

HENRY O. EVANS.

Witnesses:
ROBERT M. BARR,
C. D. McVAY.